(12) United States Patent
Niyomura et al.

(10) Patent No.: US 8,421,852 B2
(45) Date of Patent: *Apr. 16, 2013

(54) METHOD FOR MANUFACTURING STEREOSCOPIC IMAGE DISPLAY APPARATUS AND STEREOSCOPIC IMAGE DISPLAY APPARATUS

(75) Inventors: Hideo Niyomura, Gifu (JP); Hiroshi Ohno, Tokyo (JP); Joji Karasawa, Kanagawa (JP); Osamu Horie, Kanagawa (JP); Takayuki Kobayashi, Tokyo (JP); Masamichi Okada, Kanagawa (JP); Atsushi Sakata, Kanagawa (JP); Hiromichi Abe, Kanagawa (JP)

(73) Assignee: Sony Corporation (JP)

( * ) Notice: Subject to any disclaimer, the term of this patent is extended or adjusted under 35 U.S.C. 154(b) by 824 days.

This patent is subject to a terminal disclaimer.

(21) Appl. No.: 12/460,690

(22) Filed: Jul. 23, 2009

(65) Prior Publication Data
US 2010/0026792 A1 Feb. 4, 2010

(30) Foreign Application Priority Data
Jul. 28, 2008 (JP) ................ P2008-193099

(51) Int. Cl.
*H04N 13/04* (2006.01)
*H04N 9/47* (2006.01)
(52) U.S. Cl.
USPC ................... 348/57; 348/51; 348/58
(58) Field of Classification Search ........... 348/42–60
See application file for complete search history.

(56) References Cited

U.S. PATENT DOCUMENTS

| 4,269,924 A | 5/1981 | Janssens et al. |
| 4,273,863 A | 6/1981 | Deabriges et al. |
| 4,353,975 A | 10/1982 | Janssens et al. |

(Continued)

FOREIGN PATENT DOCUMENTS

| JP | 08050290 A | 2/1996 |
| JP | 08179251 A | 7/1996 |

(Continued)

OTHER PUBLICATIONS

Office Action from Japanese Application No. 2008-193099, dated Oct. 5, 2010.

(Continued)

*Primary Examiner* — Hieu Hoang
(74) *Attorney, Agent, or Firm* — Lerner, David, Littenberg, Krumholz & Mentlik, LLP (57) ABSTRACT

A method for manufacturing a stereoscopic image display apparatus includes a bonding step of bonding an image display panel and a phase difference element by disposing an adhesive layer between the entire surfaces thereof, the image display panel displaying a right-eye image and a left-eye image by regularly mixing them in a plane, the phase difference element including a right-eye image display section corresponding to the right-eye image and a left-eye image display section corresponding to the left-eye image, the phase difference element achieving different polarizations between the right-eye image display section and the left-eye image display section, the adhesive layer being composed of a transparent gel acrylic adhesive with a thickness of 25 to 100 μm, hardness of the adhesive being more than 0 and 350000 μN or less, holding strength of the adhesive at 40° C. after bonding being 8 to 20 N/20 mm.

6 Claims, 6 Drawing Sheets

U.S. PATENT DOCUMENTS

| | | | |
|---|---|---|---|
| 4,359,517 A | 11/1982 | Bourgeois | |
| 4,492,177 A | 1/1985 | Vackier et al. | |
| 4,515,461 A | 5/1985 | Vackier | |
| 4,839,692 A | 6/1989 | Shoji et al. | |
| 4,911,543 A | 3/1990 | Hodgson | |
| 4,923,848 A | 5/1990 | Akada et al. | |
| 5,001,576 A | 3/1991 | Tanaka et al. | |
| 5,235,437 A | 8/1993 | Katagiri et al. | |
| 5,236,780 A | 8/1993 | Yamane et al. | |
| 5,267,030 A | 11/1993 | Giorgianni et al. | |
| 5,298,308 A | 3/1994 | Yamane et al. | |
| 5,322,832 A | 6/1994 | Takeyama et al. | |
| 5,327,263 A | 7/1994 | Katagiri et al. | |
| 5,379,127 A | 1/1995 | Ando | |
| 5,394,875 A | 3/1995 | Lewis et al. | |
| 5,408,300 A | 4/1995 | Wataki et al. | |
| 5,420,979 A | 5/1995 | Madden et al. | |
| 5,442,464 A | 8/1995 | Ito | |
| 5,445,910 A | 8/1995 | Ishikawa et al. | |
| 5,451,560 A | 9/1995 | Akada et al. | |
| 5,452,111 A | 9/1995 | Giorgianni et al. | |
| 5,571,656 A | 11/1996 | Kingsley et al. | |
| 5,616,445 A | 4/1997 | Kelley et al. | |
| 5,629,259 A | 5/1997 | Akada et al. | |
| 5,649,267 A | 7/1997 | Aerens et al. | |
| 5,672,223 A | 9/1997 | Kimura et al. | |
| 5,673,077 A | 9/1997 | Kawakami et al. | |
| 5,689,758 A | 11/1997 | Wataki et al. | |
| 5,707,925 A | 1/1998 | Akada et al. | |
| 5,726,770 A | 3/1998 | Harada | |
| 5,736,286 A | 4/1998 | Kaneko et al. | |
| 5,767,860 A | 6/1998 | Zimmer et al. | |
| 5,790,183 A | 8/1998 | Kerbyson | |
| 5,841,521 A | 11/1998 | Kelley et al. | |
| 5,851,717 A | 12/1998 | Tsubuko et al. | |
| 5,886,818 A | 3/1999 | Summer et al. | |
| 5,940,111 A | 8/1999 | Akada et al. | |
| 5,956,044 A | 9/1999 | Giorgianni et al. | |
| 5,965,485 A | 10/1999 | Mizumachi et al. | |
| 5,987,223 A | 11/1999 | Narukawa et al. | |
| 6,046,849 A * | 4/2000 | Moseley et al. | 359/465 |
| 6,052,484 A | 4/2000 | Kobayashi | |
| 6,064,847 A | 5/2000 | Iwamatsu et al. | |
| 6,069,681 A | 5/2000 | Nakagawa et al. | |
| 6,069,716 A | 5/2000 | Yamamoto | |
| 6,096,473 A | 8/2000 | Kelley et al. | |
| 6,101,291 A | 8/2000 | Arney et al. | |
| 6,160,527 A * | 12/2000 | Morishima et al. | 345/7 |
| 6,202,073 B1 | 3/2001 | Takahashi | |
| 6,437,915 B2 * | 8/2002 | Moseley et al. | 359/465 |
| 6,963,356 B2 | 11/2005 | Satoh | |
| 6,982,178 B2 * | 1/2006 | LeCain et al. | 438/22 |
| 7,414,782 B2 * | 8/2008 | Jung | 359/465 |
| 7,554,712 B2 * | 6/2009 | Patry et al. | 359/254 |
| 7,697,204 B2 * | 4/2010 | Sugiyama | 359/465 |
| 7,813,042 B2 * | 10/2010 | Mather et al. | 359/619 |
| 2002/0071179 A1 | 6/2002 | Maeda et al. | |
| 2002/0180663 A1 * | 12/2002 | Maeda et al. | 345/9 |
| 2009/0040401 A1 * | 2/2009 | Tamura et al. | 349/15 |
| 2010/0026793 A1 * | 2/2010 | Sakata et al. | 348/54 |
| 2010/0033558 A1 * | 2/2010 | Horie et al. | 348/58 |
| 2010/0067254 A1 * | 3/2010 | Ohta et al. | 362/606 |
| 2010/0182686 A1 | 7/2010 | Fukushima et al. | |

FOREIGN PATENT DOCUMENTS

| | | |
|---|---|---|
| JP | 09227841 A | 9/1997 |
| JP | 10221643 A | 8/1998 |
| JP | 10227998 A | 8/1998 |
| JP | 2001-059948 A | 3/2001 |
| JP | 2001-075048 A | 3/2001 |
| JP | 2002-185983 A | 6/2002 |
| JP | 2002-196281 A | 7/2002 |
| JP | 2004133222 A | 4/2004 |
| JP | 2004276579 A | 10/2004 |
| JP | 2005164668 A | 6/2005 |
| JP | 2006119369 A | 5/2006 |
| JP | 2006145653 A | 6/2006 |
| JP | 2006178335 A | 7/2006 |
| JP | 2007171521 A | 7/2007 |
| JP | 2007225972 A | 9/2007 |
| JP | 2008145866 A | 6/2008 |
| JP | 2008151996 A | 7/2008 |
| JP | 2008193102 A | 8/2008 |
| JP | 2008285021 A | 11/2008 |
| JP | 2008285022 A | 11/2008 |
| JP | 2009105887 A | 5/2009 |
| JP | 2009109968 A | 5/2009 |
| WO | 2006080530 A1 | 8/2006 |
| WO | 2008029891 A1 | 3/2008 |

OTHER PUBLICATIONS

Office Action from Japanese Application No. 2008-193101, dated May 11, 2010.

Office Action from Japanese Application No. 2008-193098, dated May 11, 2010.

* cited by examiner

METHOD FOR MANUFACTURING STEREOSCOPIC IMAGE DISPLAY APPARATUS AND STEREOSCOPIC IMAGE DISPLAY APPARATUS

CROSS-REFERENCE TO RELATED APPLICATION

The present application claims priority from Japanese Patent Application No. JP 2008-193099 filed in the Japanese Patent Office on Jul. 28, 2008, the entire content of which is incorporated herein by reference.

BACKGROUND OF THE INVENTION

1. Field of the Invention

The present invention relates to a method for manufacturing a stereoscopic image display apparatus that displays a stereoscopic image using a right-eye image and a left-eye image and a stereoscopic image display.

2. Description of the Related Art

Figure 5:
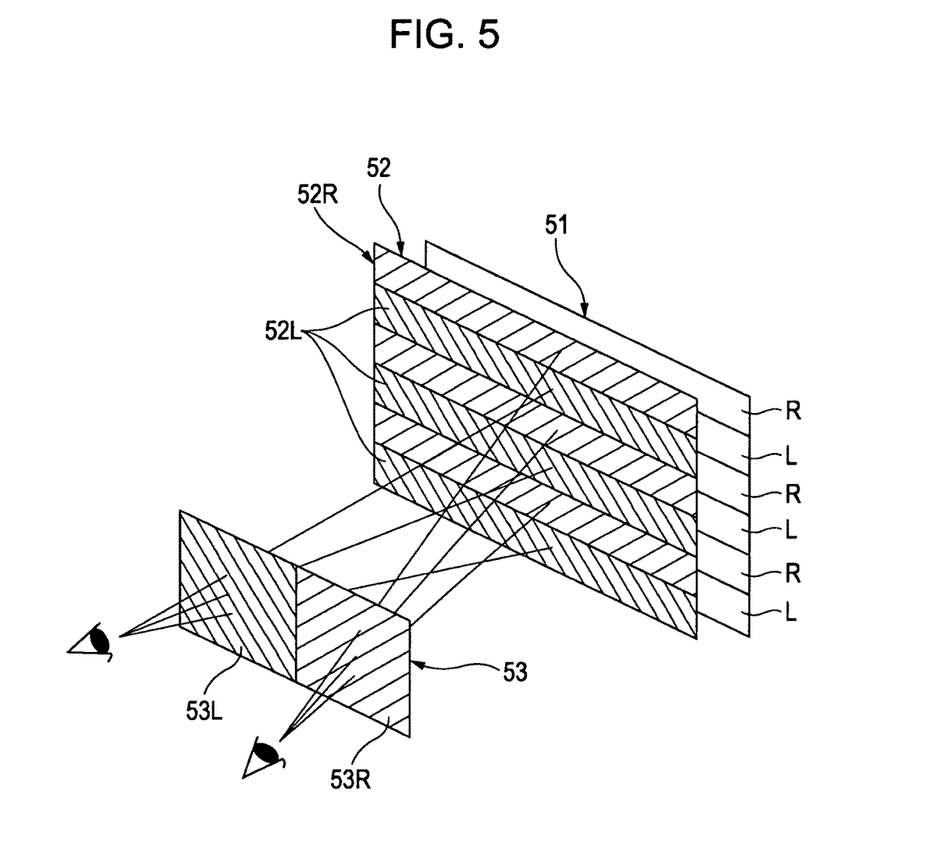
FIG. 5 shows an example of a basic outline structure of an existing stereoscopic image display apparatus.

There have been stereoscopic image display apparatuses displaying a stereoscopic image that, for example, have a structure shown in FIG. 5 (e.g., refer to Japanese Unexamined Patent Application Publication No. 2002-196281). Such a stereoscopic image display apparatus shown in the drawing includes an image display panel 51 constituted by a liquid crystal panel or the like and a phase difference element 52 disposed on the image output screen side thereof. In the stereoscopic image display apparatus, a viewer observes a display output through polarized glasses 53. Specifically, the image display panel 51 displays a right-eye image R and a left-eye image L by regularly mixing them in a plane. For example, the right-eye image R and the left-eye image L that extend in the horizontal direction are alternately displayed in the vertical direction. The phase difference element 52 includes a right-eye image display section 52R corresponding to the right-eye image R and a left-eye image display section 52L corresponding to the left-eye image L and these display sections that extend in the horizontal direction are alternately arranged in the vertical direction. The right-eye image display section 52R and the left-eye image display section 52L each achieves a different polarization. For example, the right-eye image display section 52R achieves unidirectional linear polarization (e.g., diagonally upward to the right) whereas the left-eye image display section 52L achieves 90° rotated polarization (e.g., diagonally upward to the left) that is perpendicular to the polarization of the right-eye image display section 52R. For such an image display panel 51 and phase difference element 52, when a viewer wears polarized glasses 53 in which a left glass and a right glass have different polarizing angles that are suitable for respective images, the right-eye image R enters the right eye of the viewer and the left-eye image L enters the left eye of the viewer independently. In other words, the left-eye image L on even-numbered lines is polarized diagonally upward to the left by being rotated 90° with the left-eye image display section 52L of the phase difference element 52, and is thus not seen through the right-eye glass 53R having a polarizing angle that polarizes light diagonally upward to the right. Only the right-eye image R on the odd-numbered lines having a matching polarizing angle is seen through the right-eye glass 53R. In contrast, the right-eye image R on odd-numbered lines is polarized diagonally upward to the right by being rotated 90° with the right-eye image display section 52R of the phase difference element 52, and is thus not seen through the left-eye glass 53L having a polarizing angle that polarizes light diagonally upward to the left. Only the left-eye image L on the even-numbered lines having a matching polarizing angle is seen through the left-eye glass 53L. In addition to the stereoscopic image display apparatus having the structure described above, there are various stereoscopic image display apparatuses that display left and right images by separating them and then combine the images as a stereoscopic image using polarized glasses.

To provide a stereoscopic image display apparatus that allows a viewer to observe a stereoscopic image using the polarized glasses 53, the phase difference element 52 is disposed and fixed on the image output screen side of the image display panel 51. It is proposed that the way of disposing and fixing the phase difference element 52 be to overlay the phase difference element 52 on the image display panel 51 with a magnet or the like or to bond them with a suitable glue (e.g., refer to Japanese Unexamined Patent Application Publications No. 2001-59948 and No. 2001-75048). Specifically, for example, after the periphery of the phase difference element 52 is temporarily fixed with a magnet, an adhesive tape, or the like, four or eight points of the periphery are bonded with a glue, an ultraviolet curable resin, or the like.

SUMMARY OF THE INVENTION

However, if the image display panel 51 and the phase difference element 52 are bonded at only their peripheries, the adhesion around the center of a display region is sometimes not sufficiently provided or the distance between the image display panel 51 and the phase difference element 52 may become uneven. The problems related to such adhesion, evenness, and the like cause a moiré phenomenon, Newton's rings (interference fringes), or the like, which may degrade image quality of a display image. Thus, such a moiré phenomenon and Newton's rings should be avoided.

Accordingly, to provide a stereoscopic image display apparatus, the image display panel 51 and the phase difference element 52 are bonded by disposing a binder between the entire surfaces thereof, that is, the entire surface bonding is conducted. A binder herein is a material disposed between components to bond them, and specifically corresponds to a glue or an adhesive.

However, the binder for conducting the entire surface bonding should not adversely affect the optical characteristics between the image display panel 51 and phase difference element 52.

Furthermore, an increase in the manufacturing costs of the stereoscopic image display apparatus caused by the entire surface bonding should be suppressed as much as possible. In other words, it is preferable that the binder itself used for the entire surface bonding contributes to lower costs and bonding is easily performed. In consideration of environment factors, for example, a glue including a volatile solvent should not be used as the binder for the entire surface bonding.

To prevent problems in that the image observed by a viewer becomes obscure or a stereoscopic effect is decreased, positioning with a high accuracy of 20 to 30 μm is necessary between the image display panel 51 and the phase difference element 52. Therefore, the binder used for the entire surface bonding should have holding strength that can maintain such positional accuracy.

In the present invention, it is desirable to provide a method for manufacturing a stereoscopic image display apparatus that suitably supports the entire surface bonding and a stereoscopic image display apparatus.

According to an embodiment of the present invention, there is provided a method for manufacturing a stereoscopic image display apparatus, including a bonding step of bonding an image display panel and a phase difference element by disposing an adhesive layer between the entire surfaces of the image display panel and the phase difference element, the image display panel displaying a right-eye image and a left-eye image by regularly mixing them in a plane, the phase difference element including a right-eye image display section corresponding to the right-eye image and a left-eye image display section corresponding to the left-eye image, the phase difference element achieving different polarizations between the right-eye image display section and the left-eye image display section, the adhesive layer being composed of a transparent gel acrylic adhesive with a thickness of 25 to 100 μm, hardness of the adhesive being more than 0 and 350000 μN or less, holding strength of the adhesive at 40° C. after bonding being 8 to 20 N/20 mm.

In the method for manufacturing a stereoscopic image display apparatus described above, the adhesive layer composed of a transparent gel acrylic adhesive with a thickness of 25 to 100 μm is disposed between the entire surfaces of the image display panel and the phase difference element in the bonding step of bonding the image display panel and the phase difference element. Thus, since the adhesive layer has a thickness of 25 μm or more, the uniformity of the adhesive layer is easily achieved. Since the transparent gel acrylic adhesive has a thickness of 100 μm or less, the characteristics of light that passes through the adhesive layer are not adversely affected. Furthermore, the adhesive for forming the adhesive layer has a hardness of more than 0 and 350000 μN or less. Therefore, a space between the image display panel and the phase difference element is filled with the adhesive with certainty and foreign bodies such as bubbles can be prevented from being mixed, regardless of figure tolerance or the like of the image display panel or the phase difference element. In addition, since the holding strength of the adhesive layer at 40° C. after bonding is 8 to 20 N/20 mm, the positional accuracy between the image display panel and the phase difference element before bonding is maintained even after bonding.

According to the present invention, the entire surfaces of the image display panel and the phase difference element are bonded, a moiré phenomenon, Newton's rings (interference fringes), or the like that may degrade image quality of a display image can be prevented.

In addition, the adhesive layer for the entire bonding does not adversely affect the optical characteristics between the image display panel and the phase difference element and the positional accuracy between the image display panel and the phase difference element can be maintained even after bonding, which provides a stereoscopic image display apparatus with sufficient quality.

Since the adhesive layer composed of an adhesive is used, the cost of the adhesive itself is reduced and bonding is easily conducted, compared with the case where, for example, a glue is used. An adverse effect on environment can be suppressed compared with the case where, for example, a glue including a volatile solvent is used.

To provide a stereoscopic image display apparatus, the present invention achieves the suitable entire surface bonding between the image display panel and the phase difference element.

DESCRIPTION OF THE PREFERRED EMBODIMENTS

A method for manufacturing a stereoscopic image display apparatus and a stereoscopic image display apparatus according to an embodiment of the present invention will now be described with reference to drawings.

Outline Structure of Stereoscopic Image Display Apparatus

Figure 1:
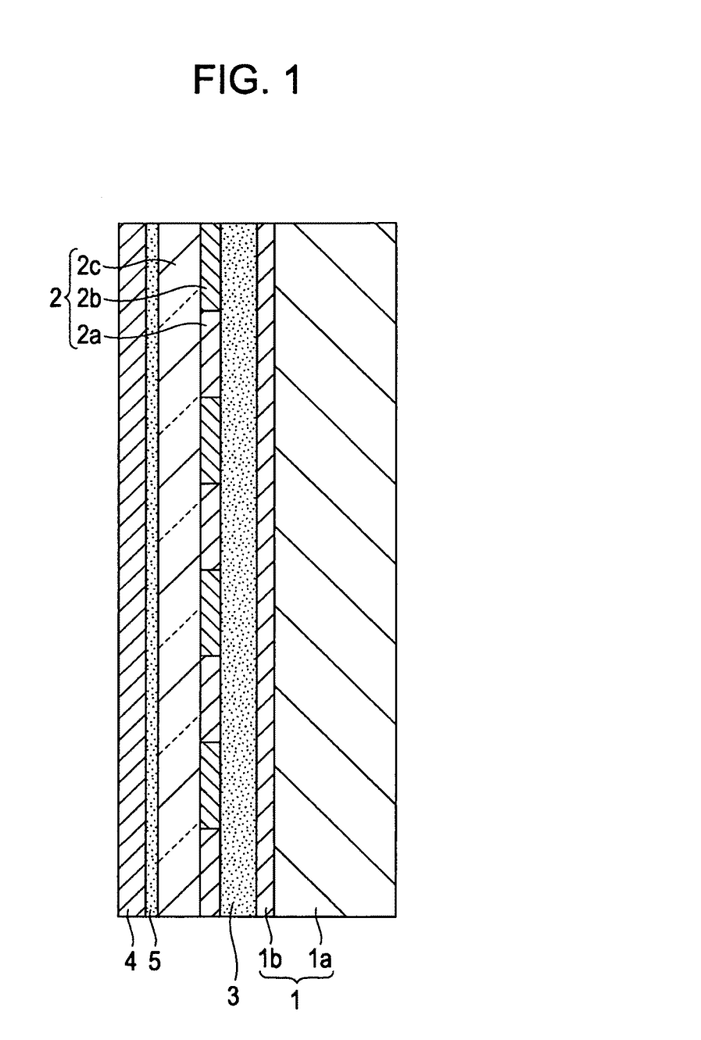
FIG. 1 shows an example of an outline structure of a stereoscopic image display apparatus according to an embodiment of the present invention.

First, an outline structure of a stereoscopic image display apparatus will be described. FIG. 1 shows an example of an outline structure of a stereoscopic image display apparatus according to an embodiment of the present invention. The stereoscopic image display apparatus shown in FIG. 1 includes an image display panel 1, a phase difference element 2, an adhesive layer 3, an antireflection film 4, and a binder layer 5.

The image display panel 1 includes at least a liquid crystal panel 1a and a polarizing plate 1b disposed on the image output screen side thereof. The image display panel 1 displays a right-eye image and a left-eye image by regularly mixing them in a plane. For example, such a right-eye image and a left-eye image that extend in the horizontal direction are alternately displayed in the vertical direction. However, such alternate display is not necessarily conducted, and the right-eye image and left-eye image may be regularly mixed in a plane using another embodiment.

In the image display panel 1, for example, if the liquid crystal panel 1a is transmissive, another polarizing plate (not shown) forming a cross nicol configuration with the polarizing plate 1b, a backlight (not shown) used as a light source, and the like are disposed on the side opposing the polarizing plate 1b with the liquid crystal panel 1a sandwiched therebetween. The image display panel 1 does not necessarily include the liquid crystal panel 1a, and may include other display devices such as an organic electroluminescence (EL) display panel and the like.

The phase difference element 2 includes a right-eye image display section 2a corresponding to the right-eye image and a left-eye image display section 2b corresponding to the left-eye image. As with the right-eye image and the left-eye image in the image display panel 1, these display sections 2a and 2b are disposed on the image output screen side relative to the image display panel 1 so as to be regularly mixed in a plane (e.g., alternately disposed in the vertical direction). The image output screen side herein is a panel screen side that outputs an image, and specifically is the side that faces a viewer who observes the image. More specifically, the phase difference element 2 includes a phase difference layer formed on a supporting substrate 2c composed of a glass material or a film without double refraction. The phase difference layer includes a portion where polarization corresponding to the right-eye image is achieved and a portion where polarization corresponding to the left-eye image is achieved, which realizes the functions of the right-eye image display section 2a and the left-eye image display section 2b. In other words, the phase difference element 2 achieves different polarizations between the right-eye image display section 2a and the left-eye image display section 2b.

For example, it is considered to use a phase difference element having a structure in which the polarizing directions of the right-eye image display section 2a and the left-eye image display section 2b are perpendicular to each other, and the right-eye image display section 2a and the left-eye image display section 2b are alternately disposed on the supporting substrate 2c having a thickness of about 0.7 mm so as to be aligned with a vertical pitch of each of horizontal lines on the image display panel 1.

Alternatively, for example, it is considered to use a phase difference element bonded to the image display panel 1 or a phase difference element in which a liquid crystal polymer layer is uniaxially oriented on the supporting substrate 2c. In this case, the phase difference element is obtained after a triacetyl cellulose (TAC) film without double refraction and a drawn polyvinyl alcohol (PVA) film having a phase difference function are stacked on the supporting substrate 2c through an adhesive; the phase difference function on a portion other than the portion where a resist is applied in a striped manner is eliminated to form the right-eye image display section 2a and the left-eye image display section 2b that are alternately arranged; and a protection film without double refraction is disposed on a side to which the resist has been applied.

The adhesive layer 3 is disposed between the image display panel 1 and the phase difference element 2 to bond them. Therefore, the adhesive layer 3 is composed of a transparent gel acrylic adhesive and formed with a thickness of 25 to 100 µm. The hardness of the adhesive is more than 0 and 350000 µN or less and the holding strength at 40° C. after bonding is 8 to 20 N/20 mm.

The adhesive herein is a semisolid originally having high viscosity and low elastic modulus. The state of the adhesive does not change after bonding, that is, a solidification process is not necessary.

The antireflection film 4 is disposed so as to cover the image output screen side of the phase difference element 2, to improve light transmittance by preventing the reflection of light on the image output screen side.

The binder layer 5 is used to bond the antireflection film 4 to the phase difference element 2 (specifically, the supporting substrate 2c constituting the phase difference element 2), and is composed of, for example, a glue or an adhesive.

In such a stereoscopic image display apparatus, the phase difference element 2 for producing a stereoscopic image is arranged on the polarizing plate 1b that is disposed on the viewer's side of the liquid crystal panel 1a, through the adhesive layer 3. The phase difference element 2 includes the right-eye image display section 2a corresponding to the right-eye image and the left-eye image display section 2b corresponding to the left-eye image, each of which achieves a different polarization.

Thus, when a viewer wears polarized glasses in which a left glass and a right glass have different polarizing angles that are suitable for respective images, the right-eye image enters the right eye of the viewer and the left-eye image enters the left eye of the viewer independently. As a result, the stereoscopic image can be observed by the viewer.

Method for Manufacturing Stereoscopic Image Display Apparatus

A method for manufacturing the stereoscopic image display apparatus having the structure described above will now be described.

The manufacturing of the stereoscopic image display apparatus includes at least an annealing step, a positioning step, and a bonding step. Each of the steps will be described hereinafter.

Annealing Step

Although the stereoscopic image display apparatus includes the phase difference element 2 as described above, the phase difference element 2 is composed of a material originally containing water and also has characteristics of adsorbing water in the air. Therefore, if the bonding of the phase difference element 2 is conducted and the front and back faces of the phase difference element 2 are sealed with an optically transparent material having no air-permeability such as a glass substrate without taking any measure, the following problem may arise.

For example, after the stereoscopic image display apparatus is shipped from its production plant as a product, it is transported by ship and may cross the equator. In that case, the ambient temperature of the product sometimes reaches 60 to 70° C. In the case where the stereoscopic image display apparatus is left in such a high-temperature atmosphere for a certain period of time, water vapor or a gas of acetic acid or the like is generated from the phase difference element 2 and bubbles having a size of about 50 to 200 µm are formed. If the front and back faces of the phase difference element 2 are sealed, the bubbles are trapped. As a result, the stereoscopic image display apparatus becomes defective.

Thus, in the manufacturing of the stereoscopic image display apparatus, an annealing step is conducted on the phase difference element 2 before the bonding of the phase difference element 2.

In the annealing step, the phase difference element 2 is heat-treated while at least one face of the phase difference element 2, that is, the face on which the right-eye image display section 2a and the left-eye image display section 2b are formed is not sealed and is thus exposed to the air.

The heat treatment is conducted at a certain temperature for a certain period of time. Specifically, in consideration of heat resistance of the phase difference element 2 that is about 100 to 120° C., the heat treatment is conducted, for example, at 40 to 80° C., preferably about 70° C., for 1 hour or more and 3 days or less, preferably about 48 hours. In this heat treatment, existing technologies can be used regarding the conditions other than those described above.

By conducting the annealing step including heat treatment, even if the stereoscopic image display apparatus is left in a high-temperature atmosphere for a certain period of time, the generation of bubbles from the phase difference element 2 that causes a product defect can be suppressed.

Specifically, a stereoscopic image display apparatus completed after an annealing step of heat-treating it, for example, at 70° C. for 24 hours and a stereoscopic image display apparatus completed without conducting the annealing step were left in an atmosphere of 70° C. for 48 hours, and the number of bubbles that were visually observed in the 14 cm×35 cm region of the panels was counted. Consequently, the number of bubbles was 61 for the stereoscopic image display apparatus obtained without the annealing step, whereas the number of bubbles was 2 for the stereoscopic image display apparatus obtained through the annealing step.

By conducting the annealing step, the generation of bubbles from the phase difference element 2 that causes a product defect can be considerably reduced.

Positioning Step

In the stereoscopic image display apparatus, the phase difference element 2 is disposed on the image output screen side of the image display panel 1 while the phase difference element 2 and the image display panel 1 are accurately positioned. If the position of the right-eye image display section 2a relative to the right-eye image, the position of the left-eye image display section 2b relative to the left-eye image, or the like is displaced without conducting accurate positioning, for example, the image observed by a viewer becomes obscure or a stereoscopic effect is decreased. For instance, in the case of displaying a high definition (HD) signal (high-vision signal) of a 40-inch screen or so, a one pixel line in a vertical direction is an extra-fine line having a size of about 500 μm. Therefore, assuming that the tolerance of displacement is less than 5%, positioning should be conducted with an accuracy of 25 μm.

In the manufacturing of the stereoscopic image display apparatus, the positioning step of determining the planar positions of the image display panel 1 and the phase difference element 2 is performed before the bonding of the phase difference element 2.

Figure 2:
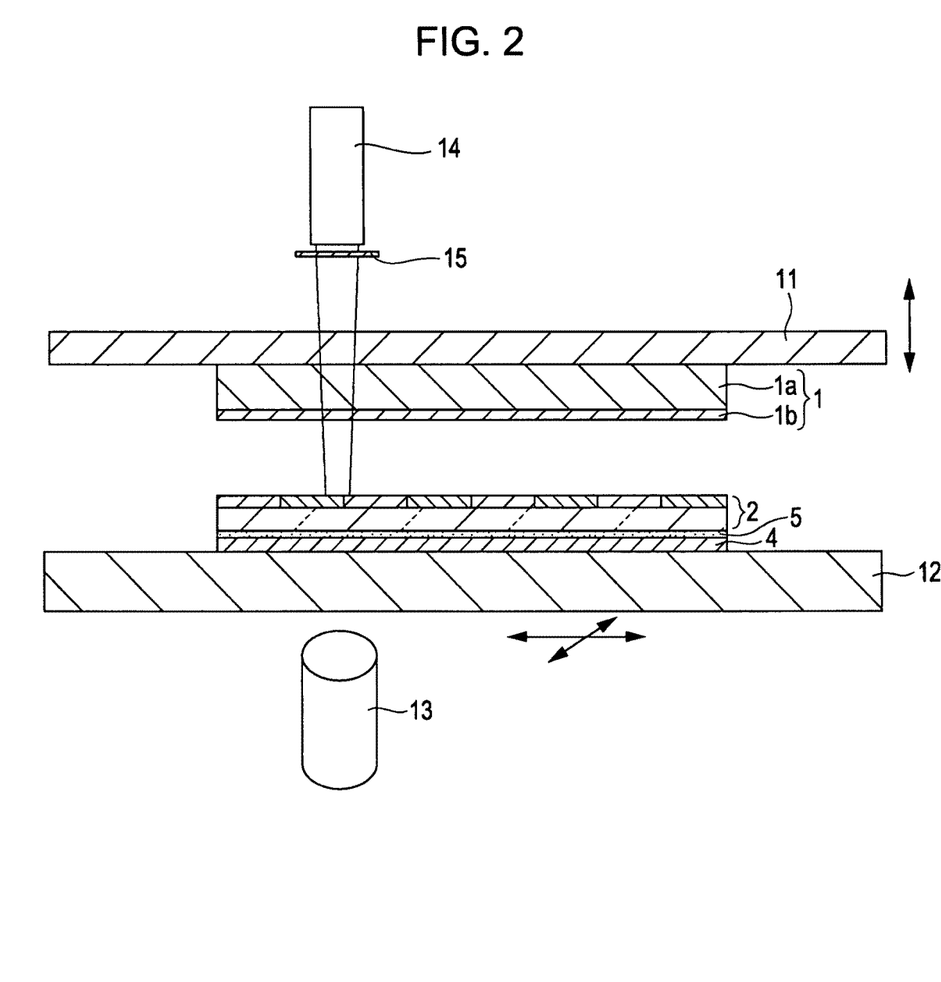
FIG. 2 shows an outline of a positioning step in a method for manufacturing a stereoscopic image display apparatus according to an embodiment of the present invention.

FIG. 2 shows an outline of the positioning step. In this case, it will be described that the image display panel 1 including the liquid crystal panel 1a and the polarizing plate 1b and a stacked body including the phase difference element 2, the antireflection film 4, and the binder layer 5 are positioned in plan view.

First, the image display panel 1 supported by an upper base 11 of a positioning apparatus is arranged so as to face the stacked body including the phase difference element 2 and the like that is supported by a lower base 12 of the positioning apparatus. Existing technologies such as vacuum attraction may be used for the supporting with the upper base 11 and the lower base 12. At least one of the upper base 11 and the lower base 12 is slidable in a front-back and left-right direction or in a vertical direction of the drawing.

The positioning apparatus includes an image pickup device 13 for position detection such as an image-processing camera on one side of the upper base 11 and the lower base 12. Furthermore, a light source 14 that emits light is disposed on the side further from the image pickup device 13 through the upper base 11 and the lower base 12. The light source 14 includes a polarizing plate 15 that achieves polarization corresponding to either the right-eye image display section 2a or the left-eye image display section 2b of the phase difference element 2.

The positioning apparatus may have a positioning mechanism that can achieve optimum positioning, with a gap, along a marking line added to an image from the image pickup device 13, by adopting a depth switching mechanism having two focuses.

In such a positioning apparatus, to position the image display panel 1 and the stacked body including the phase difference element 2, light emitted from the light source 14 reaches the stacked body through the polarizing plate 15 disposed between the light source 14 and the stacked body. The light that has passed through the phase difference element 2 constituting the stacked body is picked up using the image pickup device 13. The light emitted from the light source 14 is polarized by the polarizing plate 15. Thus, the light emitted from the light source 14 reaches the image pickup device 13 through one of the right-eye image display section 2a and the left-eye image display section 2b, but the light is shielded by the other one. Accordingly, the image pickup result of the image pickup device 13 clearly identifies the boundary between the right-eye image display section 2a and the left-eye image display section 2b of the phase difference element 2.

In the case where the liquid crystal panel 1a of the image display panel 1 is a normally black type, even if illuminating light having just backlight quantity is applied to the liquid crystal panel 1a when voltage is not applied, the light does not easily pass through the liquid crystal panel 1a. It is also not practical to apply voltage to the liquid crystal panel 1a for just a positioning process.

In the positioning apparatus, even if voltage is not applied to the normally black liquid crystal panel 1a, that is, even if the light transmittance of the liquid crystal panel 1a is minimum, illuminating light having sufficient intensity that passes through the liquid crystal panel 1a is emitted from the light source 14. Specifically, for example, more than 30000 lux of illuminating light is emitted as a minimum intensity. The maximum intensity is preferably suppressed to the extent that the light does not adversely affect liquid crystal molecules or the like of the liquid crystal panel 1a.

When the illuminating light having such intensity is emitted from the light source 14, the light reaches the image pickup device 13 through the liquid crystal panel 1a without applying voltage to the liquid crystal panel 1a even if it is a normally black type. Thus, according to the image pickup result of the image pickup device 13, the portion such as a pixel region where light passes through can be distinguished from the portion such as a wiring region covered with a light-shielding film. Consequently, the planar position of the image display panel 1 including the liquid crystal panel 1a is clearly recognized.

The positional accuracy between the image display panel 1 and the stacked body including the phase difference element 2 can be improved to a variation of about 25 μm through the positioning step described above, although there was a variation of 50 to 60 μm.

Bonding Step

After the planar positions of the image display panel 1 and the stacked body including the phase difference element 2 are determined, a bonding step of bonding them is conducted while maintaining the determined planar positions.

The image display panel 1 and the stacked body including the phase difference element 2 are bonded by providing the adhesive layer 3 disposed between the entire regions thereof. In other words, the adhesive layer 3 is attached to one of the image display panel 1 and the stacked body including the phase difference element 2, and the other is then disposed on the adhesive layer 3.

However, the adhesive layer 3 should not adversely affect optical characteristics between the image display panel 1 and the phase difference element 2 after bonding. Therefore, the adhesive layer 3 is composed of an optically transparent gel acrylic adhesive.

If the adhesive layer 3 is too thin, the uniformity of the layer is not easily achieved. It is also difficult to reduce, for example, undulations formed on the bonding surface of the image display panel 1 or the phase difference element 2 when the planar uniformity is poor. In contrast, if the adhesive layer 3 is too thick, there may be an adverse effect on the optical characteristics such as a reduction in light transmittance, and foreign bodies such as bubbles are highly likely to be mixed thereinto. Accordingly, the adhesive layer 3 is formed with a thickness of 25 to 100 μm.

If the hardness of the adhesive constituting the adhesive layer 3 is too high, a function as a cushioning material between the image display panel 1 and the phase difference element 2, a function as a filling material therebetween or the like is impaired.

If the holding strength of the adhesive layer 3 after bonding is too low, it is difficult to maintain the planar positions of the image display panel 1 and the phase difference element 2. In contrast, if the holding strength after bonding is too high, it is difficult to separate the place bonded with the adhesive layer 3 and bond it again, for example, when a malfunction is found.

Accordingly, the hardness and the holding strength after bonding of the adhesive constituting the adhesive layer 3 should be adjusted as follows.

Figure 3A:
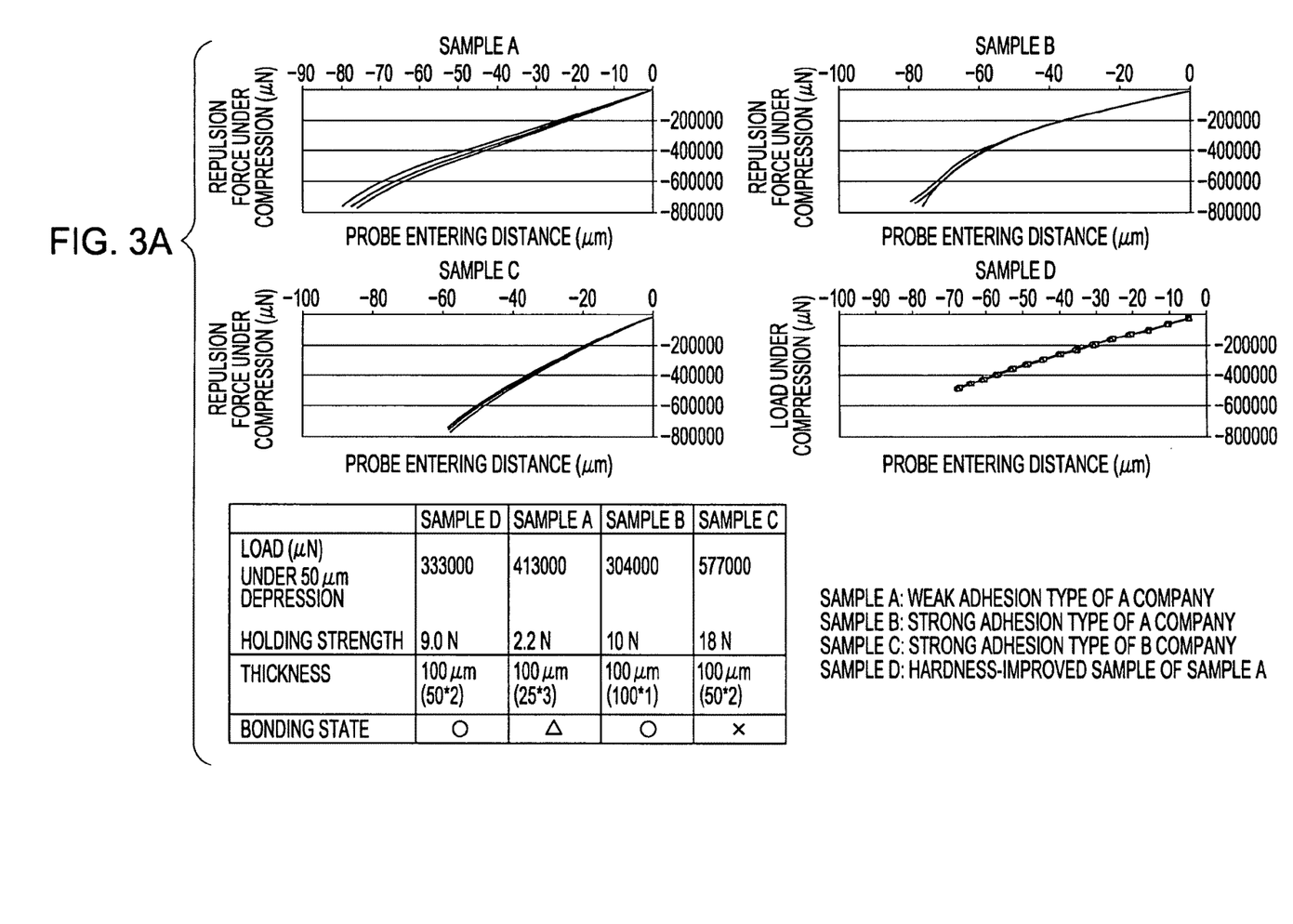
FIGS. 3A to 3C show an example of a relationship between adhesive hardness and holding strength of an adhesive layer used in the stereoscopic image display apparatus according to an embodiment of the present invention.
Figure 3B:
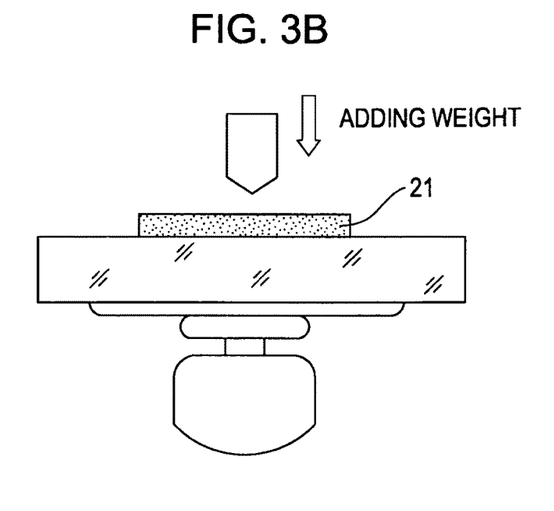
Figure 3C:
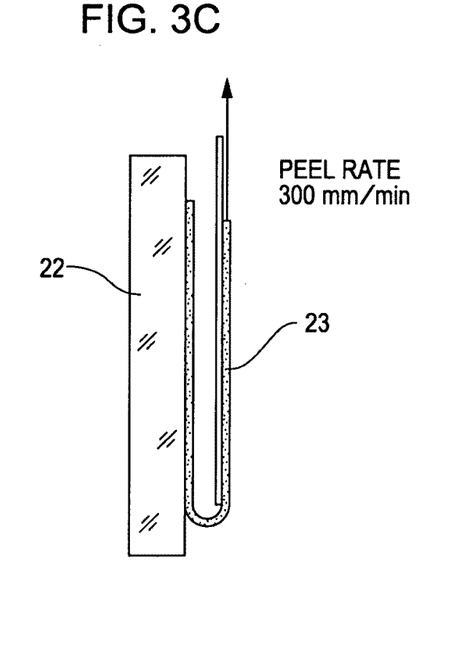

FIGS. 3A to 3C show an example of a relationship between the adhesive hardness and the holding strength of an adhesive layer.

FIG. 3A shows a comparative result of the adhesive hardness and the holding strength of an adhesive layer regarding some adhesive layers having a thickness of 100 μm.

The adhesive hardness is indicated by a repulsion force under compression (e.g., when an adhesive 21 having a thickness of 100 μm is depressed by 50 μm) as shown in FIG. 3B.

The holding strength (adhesive strength) of an adhesive is indicated by peel strength of an adhesive 23 having a width of 20 mm to a glass material 22 as shown in FIG. 3C.

According to the measurement result of the adhesive hardness and the holding strength of some layers under such conditions, as shown in FIG. 3A, it was found that the conditions under which the adhesive hardness is 350000 μN or less and the holding strength at 40° C. after bonding is 8 to 20 N/20 mm are necessary to maintain the accurately positioned state over the entire bonding surface without generating bubbles, being peeled off, or causing a problem of an appearance.

Thus, the adhesive layer 3 is adjusted such that the adhesive hardness is more than 0 and 350000 μN or less and the holding strength at 40° C. after bonding is 8 to 20 N/20 mm.

When the image display panel 1 is bonded to the stacked body including the phase difference element 2, tiny bubbles are more likely to be trapped as the panel size becomes larger. Furthermore, since it is difficult to maintain high figure tolerance or the like of the image display panel 1 or the phase difference element 2, undulations or the like are formed on the bonding surfaces thereof and the planar uniformity is highly likely to be reduced. This may cause local gaps and the adhesion and clearance therebetween may become uneven.

Accordingly, the bonding of the image display panel 1 and the phase difference element 2 is conducted by applying pressure with a bonding roller.

Figure 4A:
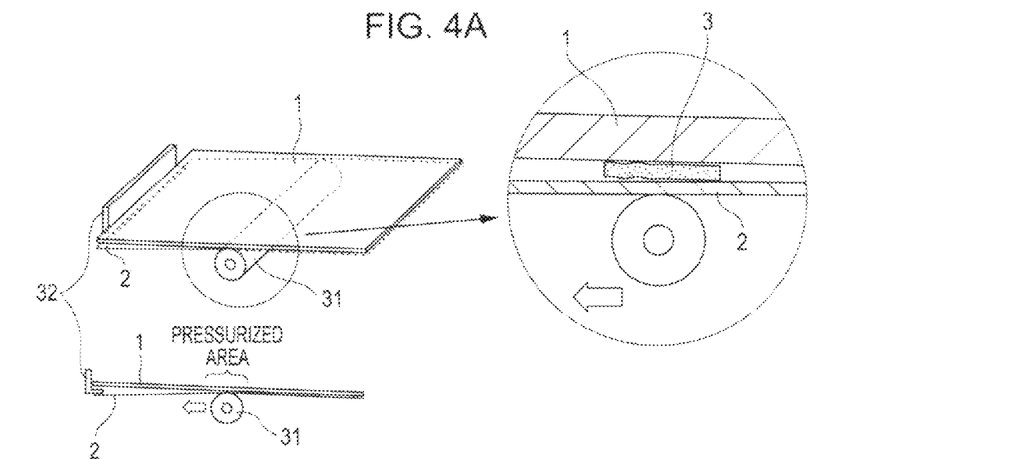
FIGS. 4A and 4B show an example of a bonding step in the method for manufacturing a stereoscopic image display apparatus according to an embodiment of the present invention, and also show an example of pressure bonding with a bonding roller.
Figure 4B:
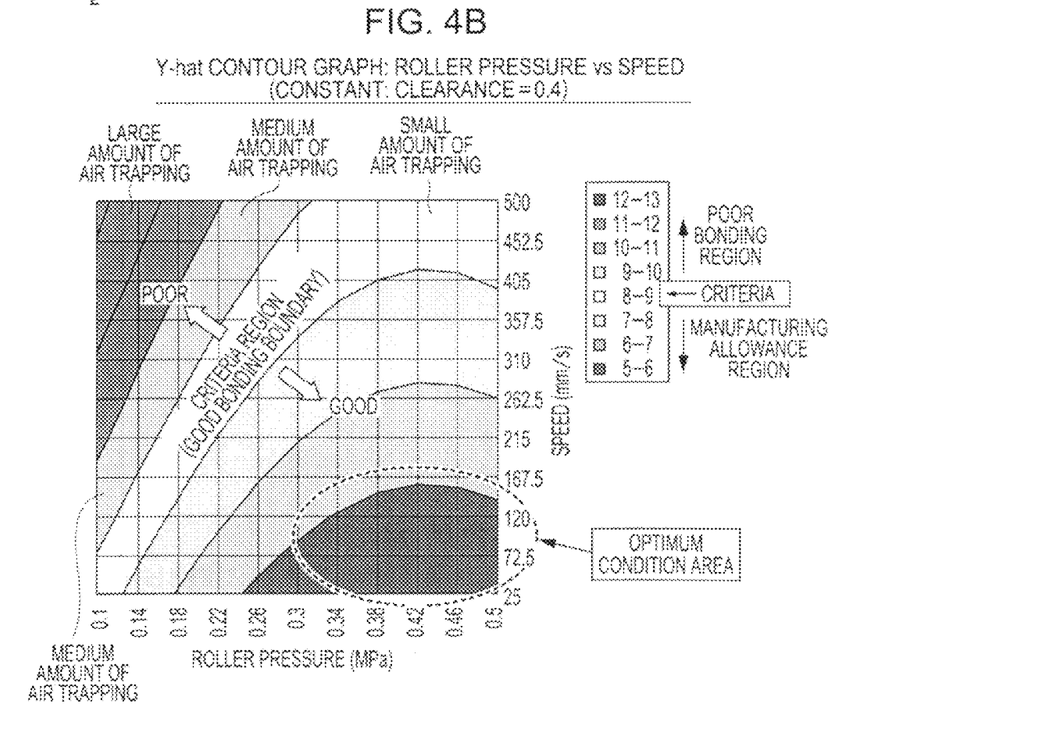

FIGS. 4A and 4B show an example of pressure bonding with a bonding roller.

As shown in FIG. 4A, when the image display panel 1 is bonded to the stacked body including the phase difference element 2, the adhesive layer 3 is disposed between the image display panel 1 and the stacked body. A bonding roller 31 that pressurizes a stacked body including the image display panel 1, adhesive layer 3, and the phase difference element 2 from its top and bottom in a stacked direction is moved from a first end of the stacked body to a second end thereof (refer to an arrow in the drawing) to bond the stacked body.

The bonding roller 31 is moved at a speed within a certain range at a pressure within a certain range.

Specifically, as shown in FIG. 4B, the bonding roller 31 is moved at a speed within an optimum condition area at a pressure within the optimum condition area. This is because bubbles or the like are highly likely to be trapped when the pressure is low or the speed is high.

The optimum condition area is obtained from an empirical rule including an experiment. FIG. 4B shows a relationship between pressure and speed of the bonding roller 31 when the clearance of a supporting member 32 described below is set to be 0.4 mm. The clearance should be adjusted in accordance with the thickness and size of the phase difference element 2 to be bonded. Therefore, the relationship between pressure and speed varies in accordance with the clearance.

During the pressure bonding with the bonding roller 31, a location of the edge of the phase difference element 2 is held such that there is a gap between the phase difference element 2 and the image display panel 1 at the second end of the stacked body that is the destination of the bonding roller 31.

Specifically, as shown in FIG. 4A, the edge of the phase difference element 2 is supported by the supporting member 32 to provide a gap between the image display panel 1 and the phase difference element 2. The location of the edge of the phase difference element 2 is shifted in coordination with the movement of the bonding roller 31. In other words, as the bonding roller 31 approaches the supporting member 32, the position of the supporting member 32 is shifted such that the gap between the image display panel 1 and the phase difference element 2 becomes small.

For the mechanism of moving the bonding roller 31 in coordination with the supporting member 32, existing technologies can be used. Thus, detail descriptions are omitted here.

By coordinating the clearance of the supporting member 32 that holds one edge of the phase difference element 2 with the speed of the bonding roller 31, the bonding is conducted while the phase difference element 2 is bent and continuously pressurized with the bonding roller 31. Thus, since means for bubbles or the like to escape is invariably provided on the destination side of the bonding roller 31, the image display panel 1 can be bonded to the stacked body including the phase difference element 2 with the smallest possible amount of fine dust or trapped bubbles mixed in it.

In addition, the pressure and speed of the bonding roller 31 are optimized so as to suppress trapping of bubbles or the like.

Even if any constituent of the stacked body including the image display panel 1, the adhesive layer 3, and the phase difference element 2 obtained after the pressure bonding described above has a poor planar portion caused by undulations or the like, local gaps are not formed and uniform adhesion and clearance are ensured because they are bonded each other under suitable and uniform pressure conditions. In the case of a large panel size, the trapping of bubbles or the like can be prevented.

Since the image display panel 1 and the phase difference element 2 are entirely bonded through the bonding step described above, a moiré phenomenon, Newton's rings (interference fringes), or the like that may cause the degradation of a display image can be prevented.

In addition, the adhesive layer 3 for the entire bonding does not adversely affect the optical characteristics between the image display panel 1 and the phase difference element 2 and the positional accuracy between the image display panel 1 and the phase difference element 2 can be maintained even after bonding, which provides a stereoscopic image display apparatus with sufficient quality.

Since the adhesive layer 3 composed of an adhesive is used, the cost of an adhesive itself is reduced compared with the case where, for example, a glue is used. Moreover, the adhesive layer 3 itself has a cushioning characteristic for external weight because an adhesive is not solidified unlike a glue. For example, even if the liquid crystal panel 1a is cracked due to a load, a glass substrate can be prevented from flying and a protective film or the like that had to be previously used becomes unnecessary. This can reduce the number of parts. Furthermore, since this bonding is not a fixing connection achieved with a glue, an ultraviolet (UV) resin, or the like, the image display panel 1 and the phase difference element 2 can be separated and then bonded again when a malfunction is found. As a result, bonding can be conducted easily. With the adhesive layer 3, an adverse effect on environment can be suppressed compared with the case where, for example, a glue including a volatile solvent is used.

In the embodiment described above, the preferred embodiments of the present invention have been described, but the present invention is not limited to the preferred embodiments. Various modifications can be suitably made within the scope of the spirit.

What is claimed is:

1. A method for manufacturing a stereoscopic image display apparatus, comprising:
    a bonding step of bonding an image display panel and a phase difference element by disposing an adhesive layer between the entire surfaces of the image display panel and the phase difference element, the image display panel displaying a right-eye image and a left-eye image by regularly mixing them in a plane, the phase difference element including a right-eye image display section corresponding to the right-eye image and a left-eye image display section corresponding to the left-eye image, the phase difference element achieving different polarizations between the right-eye image display section and the left-eye image display section, the adhesive layer being composed of a transparent gel acrylic adhesive with a thickness of 25 to 100 µm, hardness of the adhesive having a value which is both (i) more than 0 and (ii) 350000 µN or less, and holding strength of the adhesive at 40° C. after bonding being 8 to 20 N/20 mm.

2. The method for manufacturing a stereoscopic image display apparatus according to claim 1,
    wherein, in the bonding step, a bonding roller that pressurizes a stacked body including the image display panel, the adhesive layer, and the phase difference element from its top and bottom in a stacked direction at a pressure within a certain range is moved at a speed within a certain range from a first end of the stacked body to a second end to bond the stacked body; and
    during the bonding, a location of an edge of the phase difference element at the second end is held such that there is a gap between the phase difference element and the image display panel, at a position closer to the second end relative to the bonding roller, the location of the edge being shifted in coordination with movement of the bonding roller.

3. The method for manufacturing a stereoscopic image display apparatus according to claim 2, further comprising:
    a positioning step of determining a planar position of a constituent of the stacked body before the bonding step,
    wherein, in the positioning step, illuminating light emitted from a light source disposed on one side of the stacked body reaches the stacked body through a polarizing plate disposed between the light source and the stacked body, and the illuminating light that has passed through the phase difference element constituting the stacked body is then picked up with an image pickup device disposed on another side of the stacked body, whereby a boundary between the right-eye image display section and the left-eye image display section of the phase difference element is recognized.

4. The method for manufacturing a stereoscopic image display apparatus according to claim 2, further comprising:
    a positioning step of determining a planar position of a constituent of the stacked body before the bonding step,
    wherein, in the positioning step, even if light transmittance of the image display panel constituting the stacked body is minimum, illuminating light having sufficient intensity that passes through the image display panel is emitted from a light source disposed on one side of the stacked body and the illuminating light that has passed through the stacked body is then picked up with an image pickup device disposed on another side of the stacked body, whereby a planar position of each constituent of the stacked body is recognized.

5. The method for manufacturing a stereoscopic image display apparatus according to claim 2, further comprising:
    an annealing step of heat-treating the phase difference element constituting the stacked body at a certain temperature for a certain period of time before the bonding step.

6. A stereoscopic image display apparatus comprising:
    an image display panel displaying a right-eye image and a left-eye image by regularly mixing them in a plane;
    a phase difference element including a right-eye image display section corresponding to the right-eye image and a left-eye image display section corresponding to the left-eye image such that the right-eye image and the left-eye image each has a different polarization; and
    an adhesive layer disposed between the entire surfaces of the image display panel and the phase difference element to bond the image display panel and the phase difference element, the adhesive layer being composed of a transparent gel acrylic adhesive with a thickness of 25 to 100 µm, hardness of the adhesive having a value which is both (i) more than 0 and (ii) 350000 µN or less, and holding strength of the adhesive at 40° C. after bonding being 8 to 20 N/20 mm.

* * * * *